US012254584B2

(12) United States Patent
Melling et al.

(10) Patent No.: US 12,254,584 B2
(45) Date of Patent: *Mar. 18, 2025

(54) SYSTEMS AND METHODS FOR ROTATING AN AUGMENTED REALITY DISPLAY

(71) Applicant: Carvana, LLC, Tempe, AZ (US)

(72) Inventors: Alan Richard Melling, Atlanta, GA (US); Remy Tristan Cilia, Atlanta, GA (US); Bruno Jean Francois, Atlanta, GA (US)

(73) Assignee: Carvana, LLC, Tempe, AZ (US)

( * ) Notice: Subject to any disclaimer, the term of this patent is extended or adjusted under 35 U.S.C. 154(b) by 184 days.

This patent is subject to a terminal disclaimer.

(21) Appl. No.: 18/071,249

(22) Filed: Nov. 29, 2022

(65) Prior Publication Data

US 2023/0098733 A1 Mar. 30, 2023

Related U.S. Application Data

(63) Continuation-in-part of application No. 17/227,061, filed on Apr. 9, 2021, now Pat. No. 11,810,262.

(51) Int. Cl.
*G06T 19/20* (2011.01)
*G06T 15/04* (2011.01)
(Continued)

(52) U.S. Cl.
CPC ............. *G06T 19/20* (2013.01); *G06T 15/04* (2013.01); *G06T 15/06* (2013.01); *G06T 17/00* (2013.01); *G06T 2219/2016* (2013.01)

(58) Field of Classification Search
CPC ......... G06T 19/20; G06T 15/04; G06T 15/06; G06T 17/00; G06T 2219/2016;
(Continued)

(56) References Cited

U.S. PATENT DOCUMENTS 6,304,284 B1 10/2001 Dunton et al.
7,348,989 B2 3/2008 Stevens et al.
(Continued)

OTHER PUBLICATIONS

USPTO; Non-Final Office Action dated Mar. 8, 2018 in U.S. Appl. No. 14/859,695.
(Continued)

*Primary Examiner* — Chong Wu
(74) *Attorney, Agent, or Firm* — SNELL & WILMER L.L.P.

(57) ABSTRACT

Methods comprising generating, by a processor, a 3D model of an object; facilitating displaying, by the processor using the 3D model of the object, a 3D display of the object on an electronic device of a user; receiving, by the processor and from the electronic device of the user, a zoom selection on the 3D display of the object; in response to receiving the zoom selection, facilitating displaying, by the processor, a zoomed 3D display of the object on the electronic device of the user; receiving, by the processor and from the electronic device of the user, a zoom rotation selection of the object in the zoomed 3D display; and in response to receiving the zoom rotation selection, facilitating rotating, by the processor, the 3D display of the object in the zoomed 3D display on the electronic device of the user. Other embodiments are disclosed herein.

20 Claims, 5 Drawing Sheets

(51) Int. Cl.
*G06T 15/06* (2011.01)
*G06T 17/00* (2006.01)

(58) Field of Classification Search
CPC ....... G06T 2200/24; G06F 2203/04806; G06F 3/04845; G06F 3/04815; G06N 3/045
See application file for complete search history.

(56) References Cited

U.S. PATENT DOCUMENTS

| | | |
|---|---|---|
| 7,912,319 B2 | 3/2011 | Lakshamanan et al. |
| 8,212,812 B2 | 7/2012 | Tsin et al. |
| 9,659,381 B2 | 5/2017 | Mullins et al. |
| 9,928,655 B1 | 3/2018 | Alston |
| 10,284,794 B1 | 5/2019 | Francois et al. |
| 11,727,657 B2 | 8/2023 | Melling et al. |
| 11,810,262 B2* | 11/2023 | Melling .............. G06F 3/04815 |
| 2003/0117497 A1 | 6/2003 | Nicolaisen et al. |
| 2006/0269264 A1 | 11/2006 | Stafford et al. |
| 2007/0263995 A1 | 11/2007 | Park |
| 2010/0127819 A1 | 5/2010 | Radivojevic et al. |
| 2010/0214398 A1 | 8/2010 | Goulart et al. |
| 2011/0104941 A1 | 5/2011 | Chang et al. |
| 2011/0187323 A1 | 8/2011 | Gourley |
| 2012/0038636 A1 | 2/2012 | Montague |
| 2012/0062691 A1 | 3/2012 | Fowler et al. |
| 2012/0293683 A1 | 11/2012 | Osaka et al. |
| 2012/0300019 A1 | 11/2012 | Yang et al. |
| 2012/0306999 A1 | 12/2012 | Zhou |
| 2012/0320148 A1 | 12/2012 | Unger |
| 2013/0084773 A1 | 4/2013 | Mimlitch et al. |
| 2013/0181098 A1 | 7/2013 | Lin |
| 2014/0028713 A1 | 1/2014 | Keating et al. |
| 2014/0117193 A1 | 5/2014 | Wong |
| 2015/0188591 A1 | 7/2015 | Shen et al. |
| 2017/0193687 A1 | 7/2017 | Lo et al. |
| 2017/0206691 A1 | 7/2017 | Harrises et al. |
| 2019/0065027 A1 | 2/2019 | Hauenstein |
| 2020/0320727 A1 | 10/2020 | Smolic et al. |
| 2022/0189124 A1 | 6/2022 | Sanor et al. |
| 2022/0277512 A1 | 9/2022 | Ito |
| 2022/0284662 A1 | 9/2022 | Bond |

OTHER PUBLICATIONS

USPTO; Notice of Allowance dated Jun. 4, 2018 in U.S. Appl. No. 14/859,695.
USPTO; Non-Final Office Action dated Apr. 20, 2016 in U.S. Appl. No. 14/108,737.
USPTO; Notice of Allowance dated Sep. 1, 2016 in U.S. Appl. No. 14/108,737.
USPTO; Office Action dated Oct. 6, 2022 in U.S. Appl. No. 17/227,006.
Screen captures from YouTube video clip entitled "I Phone & I Pod Easy stand from a charger plug." 4 pages, uploaded on Aug. 1, 2014 by user "grouse201 O". Retrieved from Internet: <https://www.youtube.com/watch?v=SZQI7ItD2L8>.
WIKIPEDIA. "File: Image explaining how Cycloramic iPhone app Works.png." Retrieved Jul. 30, 2013. 5 pages.

* cited by examiner

SYSTEMS AND METHODS FOR ROTATING AN AUGMENTED REALITY DISPLAY

CROSS-REFERENCE TO RELATED APPLICATIONS

This application is a continuation-in-part of U.S. application Ser. No. 17/227,061, filed Apr. 9, 2021, which is herein incorporated by this reference in its entirety.

TECHNICAL FIELD

This disclosure relates generally to 3D modeling, and more specifically, to generating 3D presentations of real world objects.

BACKGROUND

Systems for displaying and generating modern 3D displays (e.g., augmented reality, virtual reality, panorama photography, photosphere photography, etc.) have made many advances in recent years, but still suffer from a number of problems. For example, bespoke models of items in a 3D display are normally rendered by hand by a trained professional (e.g., a graphic designer or animator). This manual process is time consuming and causes these models to be expensive to produce due to their complexity. Further, the length of time it takes a professional to generate a bespoke 3D model makes it difficult to scale the modeling process, while still maintaining the high real world fidelity of the object.

These problems can be further complicated when complex manipulations are performed in the 3D display. For example, rotating a 3D model in a 3D display can cause a system displaying the 3D display to shift between multiple views of an object, thereby causing the system to perform data intensive rendering tasks. In addition, many of the data intensive rendering tasks create distortions to views in the 3D display that can subtract from the real world fidelity of the 3D display.

In view of the above, there is a need for a system and method for rotating a 3D display.

BRIEF DESCRIPTION OF THE DRAWINGS

To facilitate further description of the embodiments, the following drawings are provided in which.

Figure 1:
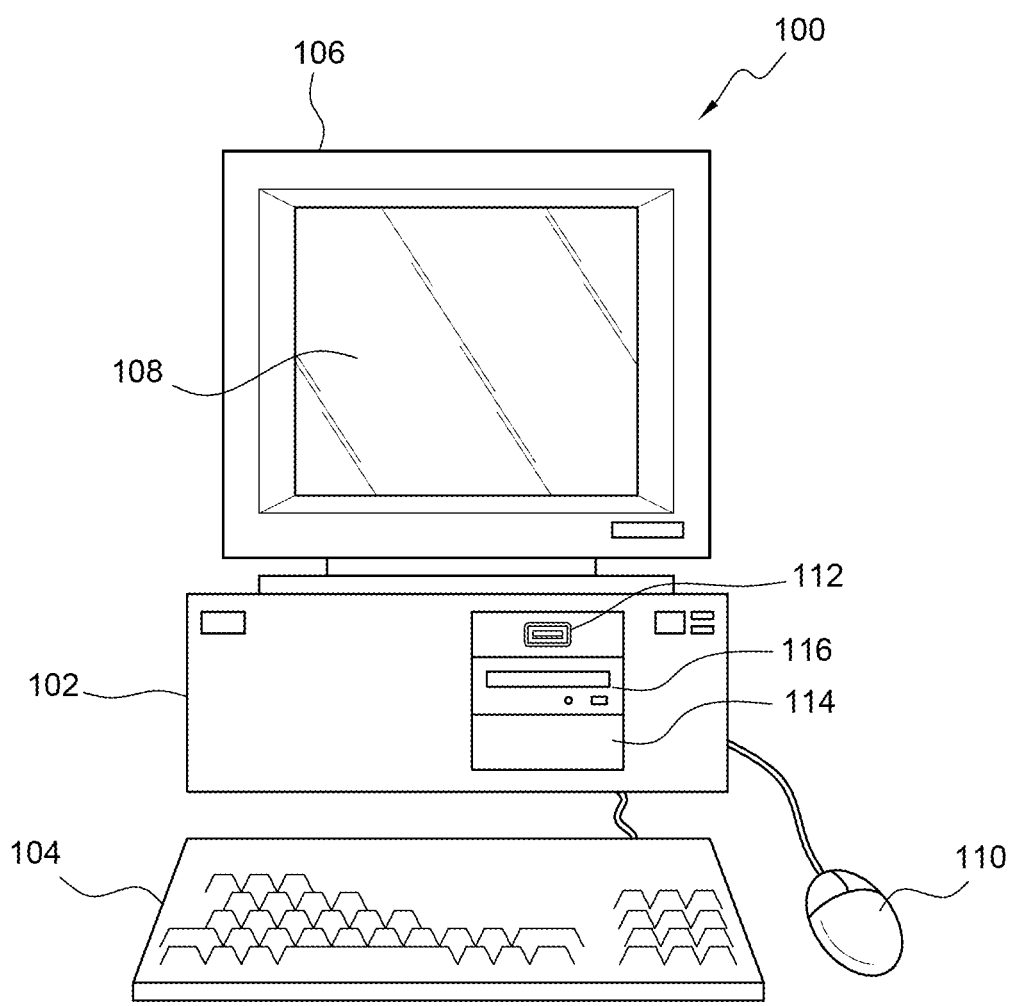
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform generating a 3D model of an object; facilitating displaying, using a 3D model of the object, a 3D display of the object on an electronic device of a user; receiving, from the electronic device of the user, a zoom selection on the 3D display of the object; in response to receiving the zoom selection, facilitating displaying a zoomed 3D display of the object on the electronic device of the user; receiving, from the electronic device of the user, a zoom rotation selection of the object in the zoomed 3D display; and in response to receiving the zoom rotation selection, facilitating rotating the 3D display of the object in the zoomed 3D display on the electronic device of the user.

Various embodiments include a method. The method can be implemented via execution of computing instructions configured to run at one or more processors and configured to be stored at non-transitory computer-readable media The method can comprise generating, by a processor, a 3D model of an object; facilitating displaying, by the processor using the 3D model of the object, a 3D display of the object on an electronic device of a user; receiving, by the processor and from the electronic device of the user, a zoom selection on the 3D display of the object; in response to receiving the zoom selection, facilitating displaying, by the processor, a zoomed 3D display of the object on the electronic device of the user; receiving, by the processor and from the electronic device of the user, a zoom rotation selection of the object in the zoomed 3D display; and in response to receiving the zoom rotation selection, facilitating rotating, by the processor, the 3D display of the object in the zoomed 3D display on the electronic device of the user.

Some embodiments can include an article of manufacture. The article of manufacture can include a non-transitory, tangible computer readable storage medium having instructions stored thereon that, in response to execution by a processor, cause the processor to perform operations comprising generating a 3D model of an object; facilitating displaying, using the 3D model of the object, a 3D display of the object on an electronic device of a user; receiving, from the electronic device of the user, a zoom selection on the 3D display of the object; in response to receiving the zoom selection, facilitating displaying a zoomed 3D display of the object on the electronic device of the user; receiving, from the electronic device of the user, a zoom rotation selection of the object in the zoomed 3D display; and in response to receiving the zoom rotation selection, facilitating rotating the 3D display of the object in the zoomed 3D display on the electronic device of the user.

Figure 2:
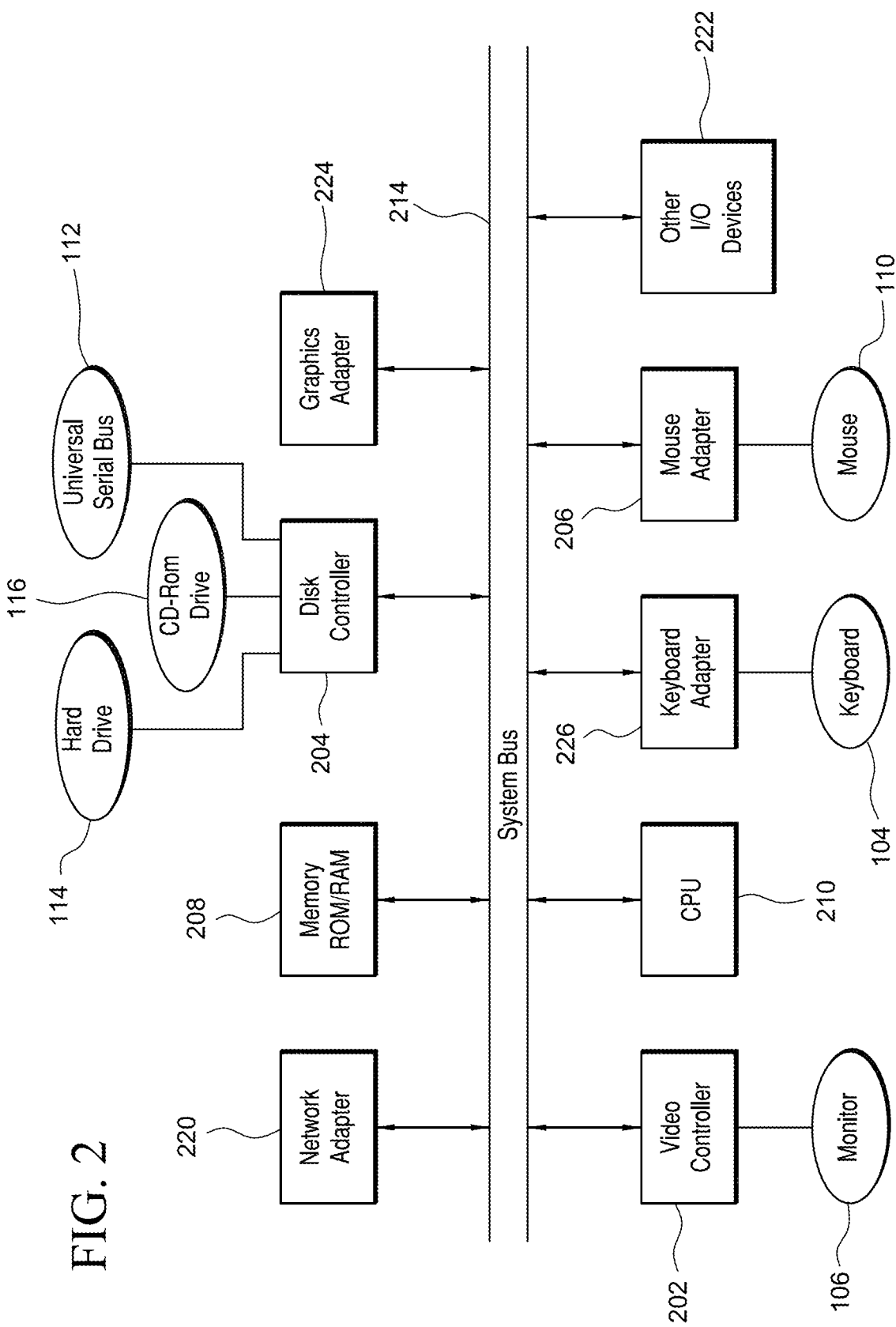
FIG. 2 illustrates a representative block diagram of an example of the elements included in the circuit boards inside a chassis of the computer system of FIG. 1, in accordance with various embodiments.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module (s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
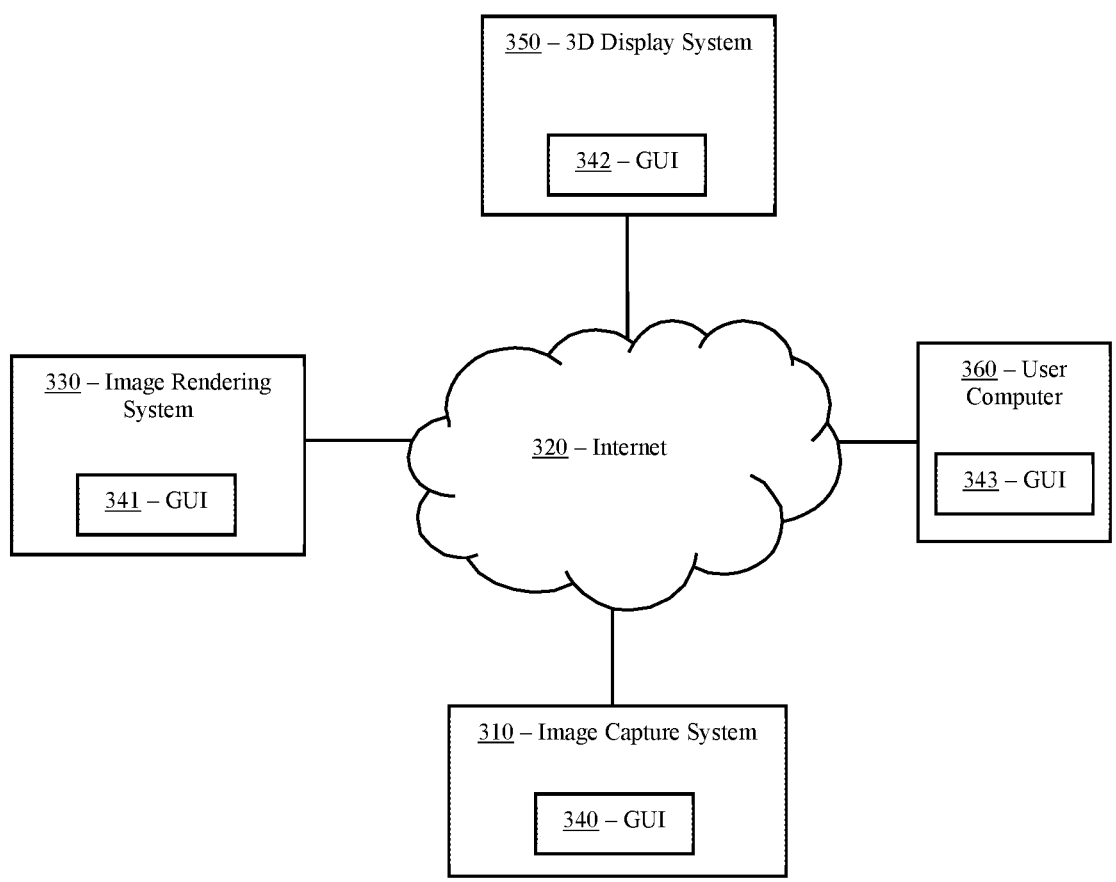
FIG. 3 illustrates a representative block diagram of a system, in accordance with various embodiments.

Turning ahead in the drawings, FIG. 3 illustrates a block diagram of a system 300 that can be employed for rendering a portion of a 3D display, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an image capture system 310, an image rendering system 330, a 3D display system 350, and/or a user computer 360. Image capture system 310, image rendering system 330, 3D display system 350, and/or user computer 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of image capture system 310, image rendering system 330, 3D display system 350, and/or user computer 360. Additional details regarding image capture system 310, image rendering system 330, 3D display system 350, and/or user computer 360 are described herein.

In various embodiments, each of image capture system 310, image rendering system 330, 3D display system 350, and user computer 360 can be a separate system, such as computer system 100 (FIG. 1). In other embodiments, or two or more of image capture system 310, image rendering system 330, 3D display system 350, and user computer 360 can be combined into a single system, such as computer system 100 (FIG. 1). In any of the embodiments described in this paragraph, each separate system can be operated by a different entity or by a single entity, or two or more of each separate system can be operated by the same entity.

As noted above, in many embodiments, system 300 comprises user computer 360. In other embodiments, user computer 360 is external to system 300. User computer 360 can comprise any of the elements described in relation to computer system 100 (FIG. 1). In some embodiments, user computer 360 can be a mobile electronic device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interface ("GUI") 340-343. In the same or different embodiments, GUI 340-343 can be part of and/or displayed by image capture system 310, image rendering system 330, 3D display system 350, and/or user computer 360, and also can be part of system 300. In some embodiments, GUI 340-343 can comprise text and/or graphics (image) based user interfaces. In the same or different embodiments, GUI 340-343 can comprise a heads up display ("HUD"). When GUI 340-343 comprises a HUD, GUI 340-343 can be projected onto glass or plastic, displayed in midair as a hologram, or displayed on a display (e.g., monitor 106 (FIG. 1)). In various embodiments, GUI 340-343 can be color, black and white, and/or greyscale. In many embodiments, GUI 340-343 can comprise an application running on a computer system, such as computer system 100 (FIG. 1), image capture system 310, image rendering system 330, 3D display system 350, and/or user computer 360. In the same or different embodiments, GUI 340-343 can comprise a website accessed through internet 320. In some embodiments, GUI 340-343 can comprise an eCommerce website. In these or other embodiments, GUI 340-342 can comprise an administrative (e.g., back end) GUI allowing an administrator to modify and/or change one or more settings in system 300 while GUI 343 can comprise a consumer facing (e.g., a front end) GUI. In the same or different embodiments, GUI 340-343 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, image capture system 310, image rendering system 330, 3D display system 350, and/or user computer 360 can be in data communication through internet 320 with each other and/or with user computer 360. In certain embodiments, as noted above, user computer 360 can be desktop computers, laptop computers, smart phones, tablet devices, and/or other endpoint devices. Image capture system 310, image rendering system 330, and/or 3D display system 350 can host one or more websites. For example, 3D display system 350 can host an eCommerce website that allows users to browse and/or search for products, to add products to an electronic shopping cart, and/or to purchase products, in addition to other suitable activities.

In many embodiments, image capture system 310, image rendering system 330, 3D display system 350, and/or user computer 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) image capture system 310, image rendering system 330, 3D display system 350, and/or user computer 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of image capture system 310, image rendering system 330, 3D display system 350, and/or user computer 360. In a similar manner, the processing module(s) and the memory storage module(s) can be local and/or remote to each other.

As noted above, in many embodiments, image capture system 310, image rendering system 330, 3D display system 350, and/or user computer 360 can be configured to communicate with user computer 360. In some embodiments, user computer 360 also can be referred to as customer computers. In some embodiments, image capture system 310, image rendering system 330, 3D display system 350, and/or user computer 360 can communicate or interface (e.g., interact) with one or more customer computers (such as user computer 360) through a network or internet 320. Internet 320 can be an intranet that is not open to the public. In further embodiments, Internet 330 can be a mesh network of individual systems. Accordingly, in many embodiments, image capture system 310, image rendering system 330, and/or 3D display system 350 (and/or the software used by such systems) can refer to a back end of system 300 operated by an operator and/or administrator of system 300, and user computer 360 (and/or the software used by such systems) can refer to a front end of system 300 used by one or more users. In these embodiments, the components of the back end of system 300 can communicate with each other on a different network than the network used for communication between the back end of system 300 and the front end of system 300. In some embodiments, the users of the front end of system 300 can also be referred to as customers, in which case, user computer 360 can be referred to as a customer computer. In other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, image capture system 310, image rendering system 330, 3D display system 350, and/or user computer 360 also can be configured to communicate with one or more databases. The one or more databases can comprise a product database that contains information about products, items, automobiles, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between image capture system 310, image rendering system 330, 3D display system 350, and/or user computer 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for automated generation of 3D displays. These techniques described herein can provide a significant improvement over conventional approaches of generating previous 3D displays, such as manual generation of displays by a graphic artist or simply performing a videotaped walkabout of an object. In many embodiments, the techniques described herein can beneficially generate 3D displays based on dynamic information. For example, the techniques described herein can be used to generate bespoke 3D displays for different types of objects in an automated workflow. In this way, these techniques can avoid problems with inconsistent generation of 3D displays by a graphic artist.

In many embodiments, the techniques described herein can be used continuously at a scale that cannot be reasonably performed using manual techniques or the human mind. For example, these techniques can be implemented in an automated workflow that allows surfaces in multiple 3D displays to be generated in series. In addition, in some embodiments, surfaces in multiple 3D displays can be generated at the same time using a distributed processing system.

In a number of embodiments, the techniques described herein can solve a technical problem that arises only within the realm of computer networks, as 3D displays do not exist outside the realm of computer networks. Further, in many embodiments, the techniques described herein can be used to generate 3D displays that mimic the look and feel of a host's website while being hosted itself somewhere else and/or by another entity. In this way, a website host can display a 3D display created by a third party while at the same time keeping users of the website on the website. In this way, losses of revenue connected to user traffic (e.g., advertising revenue) can be avoided.

Figure 4:
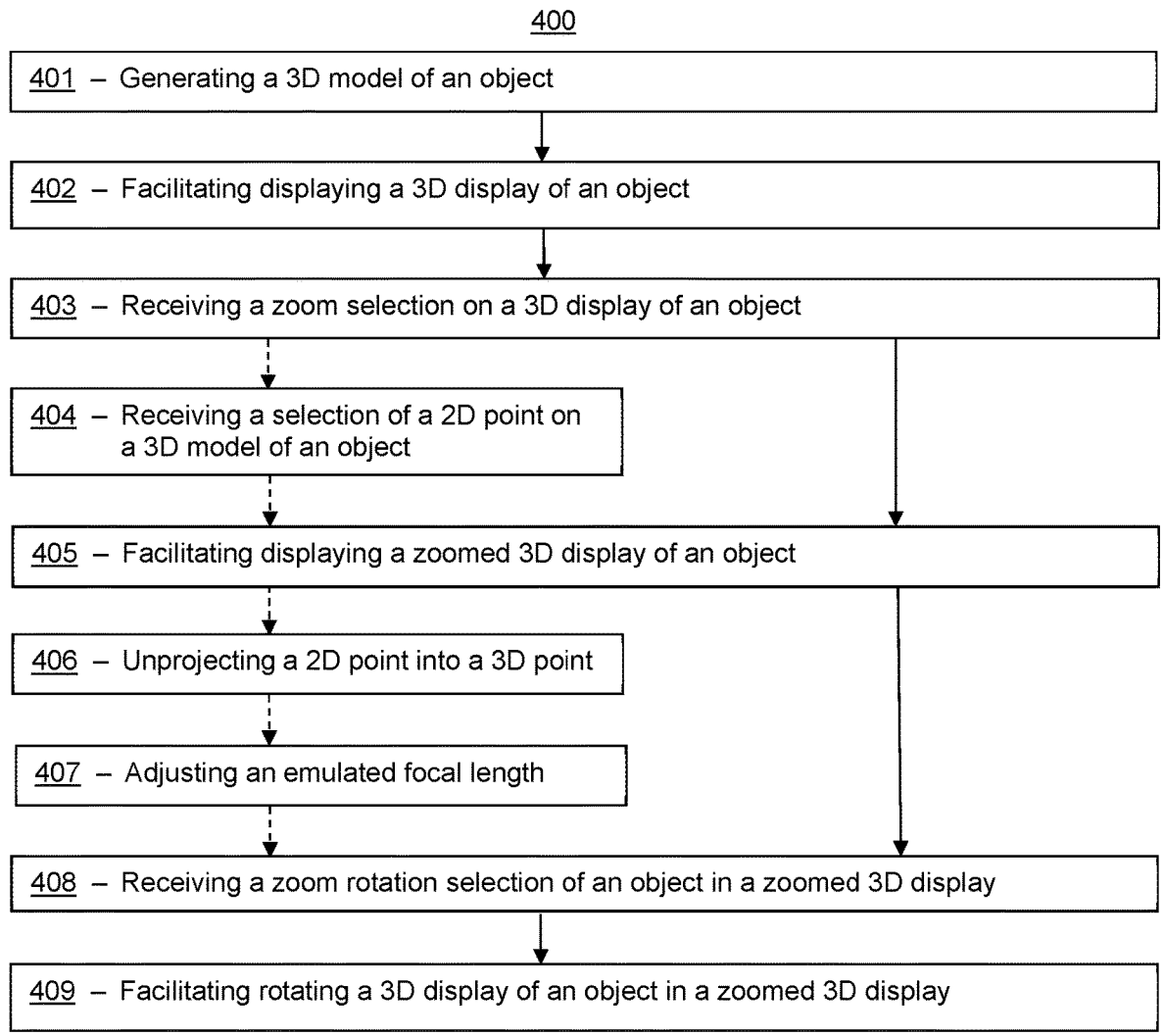
FIG. 4 illustrates a flowchart for a method, in accordance with various embodiments.

Turning ahead in the drawings, FIG. 4 illustrates a flow chart for a method 400, according to various embodiments. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as image capture system 310, image rendering system 330, 3D display system 350, and/or user computer 360 (FIG. 3). The processing module(s) can be similar or identical to the processing module(s) described above with respect to computer system 100 (FIG. 1).

In various embodiments, method 400 can comprise an activity 401 of generating a 3D model of an object. In some embodiments, activity 401 can comprise receiving a pre-generated 3D model of an object. For example, a 3D model of an object can be purchased from a third party or a previously generated 3D model can be used. In various embodiments, a 3D model of an object can be generated using one or more images. In some embodiments, one or more images can be of one or more objects (e.g., an automobile). In these or other embodiments, the one or more objects can be a subject of or a part of a 3D display, as described in further detail below. In various embodiments, one or more images can be taken in a real-world capture environment. In these or other embodiments, a real-world capture environment can comprise a 3D scanner. For example, an EinScan SE Desktop 3D Scanner, an Afinia EinScan-Pro 2× PLUS Handheld 3D Scanner, and/or an EinScan-SE White Light Desktop 3D Scanner can be used. In these or other embodiments, a 3D scanner can comprise a photography studio configured to create 3D displays. For example, application Ser. Nos. 15/834,374 and 16/404,335, which are incorporated herein by this reference in their entirety, describes a representative photography studio configured to create 3D displays. In many embodiments, a 3D scanner can comprise a stage where an object to be scanned is placed. In various embodiments, the stage can be located in an interior chamber of a 3D scanner. In these or other embodiments, a stage can be placed in approximately a center of an interior chamber of a 3D scanner. In some embodiments, an interior chamber of a 3D scanner can be configured to generate uniform lighting onto a stage. In some embodiments, one or more images can be taken in other real-world capture environments that are not a 3D scanner. For example, the one or more images can be taken outside or in a building using a handheld camera, a smartphone, a wearable electronic device, and/or some other portable electronic device outfitted with an image sensor (e.g., user computer 360 (FIG. 3)). In many embodiments, a 3D scanner can be a part of and/or controlled by image capture system 310 (FIG. 3).

In many embodiments, one or more images can be taken radially around (e.g., around a central axis) an object. In this way, the one or more images can be of the one or more objects from multiple angles, thereby giving a 360 degree view around the one or more objects when combined. In embodiments where a 3D scanner is used, various techniques can be used to obtain radially captured images. For example, one or more cameras can be mounted to a rail along the circumference of an interior chamber, and these cameras can then be driven around the object while taking photographs. As another example, a stage of a 3D scanner can be configured to rotate while one or more cameras mounted at fixed positions take photographs. In embodiments where a portable electronic device is used to take the one or more images, a user of the portable electronic device can be instructed by a software application stored on the portable electronic device to walk around an object while taking pictures.

In various embodiments, each image of the one or more images can be associated with metadata identifying the position of a camera that took the image. For example, sensor data (e.g., gyroscope data, accelerometer data, compass data, global positioning system ("GPS") data) or augmented reality data (e.g., structure-from-motion data) can be included in image metadata. In many embodiments, image metadata can be used to identify a value for a camera's six degrees of freedom (e.g., forward/back, up/down, left/right, yaw, pitch, roll) or 3 coordinate position (e.g., on an x, y, z coordinate plane). In embodiments where a 3D scanner is used, this positional information can be known in advance (e.g., by preconfiguring a camera's position and orientation) or computed by the 3D scanner while it is scanning the object. In embodiments where a portable electronic device is used, one or more location tracking modules (e.g., accelerometers, Bluetooth beacons, Wi-Fi location scanning, GPS, etc.) can be used to determine a position of the portable electronic device in space. In this way, metadata for each image of the one or more images can be used to orient a camera about the object. In some embodiments, one or more images can be received from an image capture system 310 (FIG. 3) and/or user computer 360 (FIG. 3). In these or other embodiments, an image capture system 310 (FIG. 3) can be a part of and/or integrated with a 3D scanner, as described above. In various embodiments, image capture system 310 (FIG. 3) can comprise a software application installed on a computer system (e.g., system 100 or user computer 360 (FIG. 3)).

A 3D model of an object can be generated in a number of different ways. For example, a 3D model can be generated using polygonal modeling, curve modeling, and/or digital sculpting. Generally speaking, polygonal modeling can begin by generating points in 3D space, called vertices. These vertices can then be connected by line segments to form a polygon mesh that is the 3D model. Generally speaking, curve modeling is a 3D model generation technique that defines surfaces of an object using curves. These curves can be created using control points, which can be weighted. In various embodiments, a curve follows the control points to create the 3D model. In some embodiments, increasing a weight for a control point will pull the curve closer to that control point. Curve types can include nonuniform rational B-splines (NURBS), splines, patches, geometric primitives, and many others.

Digital sculpting can be performed in a number of ways. For example, digital sculpting can be performed using a displacement method, a volumetric method, a dynamic tessellation method, and many other methods. Displacement methods use a more information dense model sometimes generated by subdividing polygonal control points. This creates adjusted vertex locations that can be stored as an image map that functions as a 3D model. Volumetric methods carve 3D models using voxels. Generally speaking, voxels can comprise monomers generated when a rectangular grid is overlaid over a three dimensional space, similar to how a pixel is used to make up an image. Voxels are removed from a 3D model until a shape representing a real world object is created. Dynamic tessellation can be similar to using voxels, but, instead of a rectangular grid, a triangular grid is used.

In some embodiments, textures are added to a 3D model in order to make the model look more realistic. In these or other embodiments, images of a real world object (e.g., such as images taken with a 3D scanner) can be used as textures. Textures can be added to models in a number of ways. For example, view dependent texture mapping can be used to add textures to a 3D model and/or generate novel views of a real world object converted into a 3D model. Generally speaking, view dependent texture mapping can be seen as using projective texture mapping to generate a novel view of an object. Projective texture mapping can be conceptually understood as replacing each camera in a 3D scanner with a slide projector that projects images taken by the 3D scanner onto a 3D model as textures. In this way, when a user views a 3D display on their electronic device, images from the 3D scan can be loaded for each viewpoint. A problem can arise when lower resolution captures are used as textures for the 3D model because there are not enough images to project textures from every position around the real world item. For example, when 64 approximately evenly spaced captures are performed for an object in a 3D scanner (e.g., one photo every 6 degrees azimuthally), certain portions of an image can be improperly projected onto a bounding surface created by a 3D model (e.g., headrests in an automobile's interior). Further, when a mobile or poorly calibrated capture is performed, images can be captured with varying forward/back distance, focal length, pitch, yaw, roll, lighting, etc. In these embodiments, a process known as image blending can be used to generate novel views of an object and/or fill in gaps in a that were not captured by a 3D scanner. In this way, a more detailed 3D display can be generated while at the same time lowering throughput for a 3D scanner, thereby allowing a 3D scanner to perform more scans before maintenance is needed.

Generally speaking, image blending can be seen as a quantitative method for determining a color of a pixel in a novel view. In the context of a 3D surround image, the color of the pixel in the novel view is constructed from images on each side of the novel view (e.g., the nearest neighbors to the coordinates of the novel view). Which or how much of each nearest neighbor pixel incorporated into a blended pixel can be weighted such that one pixel's contribution is more than another pixel's. In some embodiments, weightings for pixels can determined using a fitness function. In various embodiments, 3 coordinate positions and/or degrees of freedom of a camera recorded in a 3D scanner can be used in the fitness function to generate pixel weightings. A number of different fitness functions can be used, but, generally speaking, a fitness function can take into account angles and distances generated by a novel viewpoint and the two adjacent viewpoints. A number of different fitness functions can be used. For example, an interpolation algorithm can be used as a fitness function. Generally speaking, interpolation algorithms are methods of curve fitting that construct new data points for an already known data set. Within the context of image blending, interpolation algorithms can be used to generate functions that determine pixel weightings. While interpolation functions (e.g., linear interpolation functions) can be used alone to determine pixel weights, implementing an easing curve can provide for a more lifelike and less composited rendering of an object. This is because interpolation functions can generate a high number of novel pixels and/or viewing angles, which in turn can cause a more video-game like appearance for an object in a 3D display. Therefore, it can be beneficial to have at least a portion of a novel viewing angle be blended (e.g., for visual smoothness) while simultaneously providing space around each source image to show a real world view of an object. Therefore, in many embodiments, an easing curve can be implemented while blending images to provide for a 3D display that is truer to a real life view of an object. A number of different types of easing functions can be used. For example, an easing function can be linear, hyperbolic, parabolic, sigmoid, piece wise, etc. In various embodiments, an easing function can be determined algorithmically using data gathered from real world images (e.g., camera positions, camera configurations, pixel values, etc.). In these embodiments, a Hermite interpolation algorithm can be used to generate an easing curve. Generally speaking, Hermite interpolation computes a polynomial of degree less than mn such that the polynomial and its m−1 first derivatives have similar or identical values at n given points as a given function and its m−1 first derivatives.

In many embodiments, method 400 can comprise an activity 402 of facilitating displaying a 3D display of an object. In various embodiments, a 3D display can be displayed on a website and/or in an application installed on a computer system (e.g., one or more of image capture system 310 (FIG. 3), image rendering system 330 (FIG. 3), 3D display system 350 (FIG. 3), and/or user computer 360 (FIG. 3)). In various embodiments, a 3D display can be generated using one or more images of an object created in any of the previous steps and/or using a 3D model created using these images. For example, blended images (e.g., images created using view dependent texture mapping) can be used to generate a 3D display. Many techniques exist for generating a 3D display from one or more images of an object. For example, U.S. Pat. Nos. 9,412,203, 9,996,663, 10,284,794, and 10,423,995 (which are all incorporated herein by this reference in their entirety) describe systems and methods for generating 3D displays. In some embodiments, a 3D display and/or textures on a 3D model can iterate through one or more images of an object as a user navigates around the 3D display. In these or other embodiments, one or more images of an object can be used as textures for a 3D model of an object that can then be navigated around in the 3D display. In these embodiments, when a user stops the 3D model on a view in-between the one or more images, view dependent texture mapping can be used to generate a novel view. In some embodiments, view dependent texture mapping can be used iteratively (e.g., without any pre-generation of blended pixels described below) as a user navigates around a 3D display to save on storage space on a system generating a 3D display.

In some embodiments, a 3D display can have a synthetic background. For example, images used to generate a 3D model of a real world object can have their background removed and replaced or altered for privacy (e.g., blurred or pixelated).

In many embodiments, method 400 can comprise an activity 403 of receiving a zoom selection. In various embodiments, a zoom selection can comprise an interaction with a GUI (e.g., an interaction with GUI 343). For example, a user can tap or click an area on a 3D display to zoom to that area. As other examples, a user on a touch screen device can use a pinch, a reverse pinch, or a drag to zoom to a point. As further examples, a user using a mouse, trackball or joystick can actuate one or more inputs on the mouse, trackball, or joystick to initiate a zoom (e.g., by performing movements that would click or move a cursor or by rolling a scroll wheel). As an additional example, a user can use a first interaction to select a zoom point or to enter a zoom mode on the GUI and then second interaction initiate the zoom (e.g., by clicking a point on a 3D display and then rolling a scroll wheel to zoom).

In many embodiments, method 400 can comprise an optional activity 404 of receiving a zoom selection of a 2D point. In various embodiments, activity 404 can be performed as a part of or concurrently with activity 403. In some embodiments, a zoom selection can be made on a 3D display having a 2D coordinate system overlaid on top of the display. For example, a 3D display shown on a display device (e.g., monitor 106 (FIG. 1) and/or screen 108 (FIG. 1)) can be described by a 2D coordinate system in the plane of the display device. In these embodiments, 2D coordinates of the zoom selection can be determined. For example, a software plugin (e.g., a JavaScript plugin or mobile application) running on a user device can determine the 2D coordinates of the selection. In various embodiments, 2D coordinates of a point selected in a zoom selection (i.e., a zoom selection point) can be included in the zoom selection when received. In other embodiments (e.g., when a zoom mode is entered before zooming), 2D coordinates of a point can be received after a zoom selection is made. For example, a center of a pinch motion can be set at the 2D point. In various embodiments, a 3D display can be centered on a zoom selection point.

In many embodiments, method 400 can comprise an activity 405 of facilitating displaying a zoomed 3D display of the object. In various embodiments, a zoomed 3D display can comprise a 3D display that has been enlarged. In some embodiments, a zoomed 3D display can comprise a display whose viewing plane has been moved closer to a 3D model. In these or other embodiments, a zoomed 3D display can continue to render unseen portions of a 3D display or can crop out all or a portion of the unseen portions. In embodiments where the 3D display is cropped, burdens on a graphics processing device rendering the zoomed 3D display can be lessened, thereby leading to faster processing times. In various embodiments, a 3D display can comprise different images than a zoomed 3D display. For example, a non-zoomed 3D display can use images of an object taken with a 3D scanner while a zoomed 3D display can show blended images or a combination of both the image from the 3D scanner and blended images. As another example, a 3D display can comprise lower resolution images of an object, and a zoomed 3D display can comprise higher resolutions images of the object. As a further example, lower resolution images of an object can comprise higher resolution images of the object that have been compressed, stored in a different image file format (e.g., as a JPEG, a GIF, TIFF, BMP, etc.), and/or have a smaller storage size. In this way, transmission and/or processing times for displaying a 3D display can be lessened so that the 3D display can be created on a lower quality system or a system with lower computing power. In these or other embodiments, a zoomed 3D display can provide additional details about a 3D display that are either not shown or are smaller on the original 3D display. For example, a zoomed 3D display can show imperfections (scratches, dents, dings, etc.) or additional features (e.g., aftermarket additions or enhanced feature packages) of an object shown in a 3D display, where the original 3D display does not show such imperfections or shows fewer details of such imperfections.

In many embodiments, activity 405 can comprise zooming a 3D display into a zoomed 3D display. In these or other embodiments, zooming a 3D display into a zoomed 3D display can comprise immediately displaying (e.g., a hard cut to) the zoomed 3D display without a transition or animation. In various embodiments, zooming a 3D display into a zoomed 3D display can comprise one or more zoom animations (i.e., zoom transitions). In many embodiments, a zoom animation can comprise a fade in or out animation, a defocus and refocus animation, a dissolve animation, an iris animation, a wash animation, a wipe animation, a morph animation, or other types of scene transitions known in the art. In some embodiments, a zoom animation can comprise a smooth zoom animation into a zoomed 3D display from a 3D display. In these embodiments, a smooth zoom animation can be generated using one or more Bezier curves.

In many embodiments, activity 405 can comprise centering a view of a camera on a 3D point. Generally speaking, views within a 3D display can be modeled as an image taken with an emulated a camera. In this way, views in a 3D display can be modified and/or changed digitally by altering a property of an emulated camera. In some embodiments, an emulated camera can have similar or identical settings, configurations, or positions when compared to a real world camera (e.g., one in a 3D scanner or a user device). For example, an emulated camera can have an emulated aperture, emulated focal length, and/or emulated six degrees of freedom.

In some embodiments, method 400 can optionally comprise activity 406 of unprojecting a 2D point into a 3D point. In many embodiments, activity 406 can be performed concurrently with, as a part of, and/or after activity 405. Generally speaking, unprojecting translates a set of 2D coordinates into a set of 3D coordinates. For example, a 2D point selected on a 3D display can be unprojected to a 3D point on a 3D model. In various embodiments, an unprojected 2D point can yield a 3D ray extending from a plane of the 2D point (e.g., the plane of monitor 106 (FIG. 1)) into the 3D display. 2D points can be unprojected in a number of different ways. For example, gluUnProject, an algorithm available in the OpenGL set of APIs, can be used. gluUnProject calls a number of matrices (e.g., model, projection, and view matrices) and performs matrix mathematics to generate coordinates for an unprojected point or ray. In many embodiments, gluUnProject can be run twice. In this way, two 3D points can be determined so that a ray can be drawn through them. One disadvantage to using gluUnProject is that it requires a large amount of computing power to perform its matrix mathematics, which is doubled when performed twice. This, in turn, can slow down zooming of a 3D display into a zoomed 3D display. Further, due to the intensive calculations required, this may be impactable or impossible to run on computing systems with less powerful processors (e.g., mobile and/or wearable computing systems).

In many embodiments, a 2D point can be projected into a 3D display using a ray casting algorithm. Generally speaking, ray casting involves creating a virtual light ray that is cast or traced on its path from a focal point of a camera through a pixel in the camera sensor to determine what is visible along the ray in the 3D scene. Ray casting is traditionally implemented when rendering 3D scenes into to 2D images (e.g., when rendering a 3D display into a 2D image on a monitor). Ray casting can be used here because a precise location and/or orientation of a camera is known. For example, a 3D scanner will provide six degrees of freedom for the camera. As another example, readings from a gyroscope and/or positional sensor on a mobile device can be used to generate a location in space for a camera. A number of different ray casting algorithms can be used. For example, Raycaster, a ray casting algorithm native to the three .js library, can be used or raycast, a raycasting algorithm native to Apple's SceneKit library, can be used.

In some embodiments, method 400 can optionally comprise activity 407 of adjusting an emulated focal length.

Much like with a physical camera, an emulated focal length of an emulated camera can be increased to zoom in and decreased to zoom out. In some embodiments, a focal length can be adjusted according to one or more equations and/or curves. In various embodiments, a focal length can be adjusted continually or periodically as a zoom animation progresses. Adjusting an emulated focal length can have a number of advantages over enlarging an image or other ways of zooming in and out. For example, depth of field effects (e.g., background blur on real or synthetic backgrounds) are preserved when changing an emulated focal length because an emulated aperture is not changed. Further, image distortions caused by enlargement can be avoided. In various embodiments, a thin lens equation can be used to calculate an emulated focal length. In many embodiments, a thin lens equation can comprise:

$$\frac{1}{o} + \frac{1}{i} = \frac{1}{f}$$

In these embodiments, o can comprise an object distance, i can comprise an image distance, and f can comprise a focal length. In many embodiments, an object distance can comprise a distance from an emulated camera to a 3D model. In more specific embodiments, an object distance can comprise a distance from a center of an emulated lens of an emulated camera to a center of a 3D model. In these or other embodiments, an image distance can comprise a distance from an emulated camera to a viewport displayed to a user. In more specific embodiments, an image distance can comprise a distance from a center of an emulated lens of an emulated camera to the viewport. In many embodiments, f can comprise a focal length of an emulated camera.

In many embodiments, a magnification equation can be used in combination with a thin lens equation to zoom 3D display into a zoomed 3D display. In various embodiments, a magnification equation can comprise:

$$M = \frac{i}{o}$$

In these embodiments, M can comprise a magnification of an image, o can comprise an object distance, and i can comprise an image distance. The thin lens equation and the magnification equation can be used in combination to determine how far to zoom an emulated camera to get a desired viewport for a user. For example, holding i constant to maintain a consistent view while decreasing o to zoom will increase a magnification of a 3D display. This, in turn, causes f to decrease as the 3D display is zoomed.

In many embodiments, an image can be in a same or similar medium as an object:

$$m = \frac{i}{o}$$

In various embodiments, it can be beneficial to hold a projected image size constant regardless of an object distance. Therefore the previous equation can be reformulated as:

$$i = om$$

This reformulated equation can be inserted into the thin lens equation shown above:

$$\frac{1}{o} + \frac{1}{mo} = \frac{1}{f}$$

If one were to solve for f, the thin lens equation with an insertion can comprise:

$$f = \frac{o}{\frac{1}{m} + 1}$$

In many embodiments, the formulation of the thin lens equation with the insertion can ignore a cartesian sign convention where o would be a negative distance. This is because, even though o is oppositional to a direction of light, giving it a negative value would introduce a number of negative values that, while mathematically correct, can reduce overall conceptual clarity and provide a less true to life 3D display.

In many embodiments, method 400 can comprise an activity 408 of receiving a zoom rotation selection. In these or other embodiments, a zoom rotation selection can be configured to initiate rotation of a zoomed 3D display. In some embodiments, a zoom rotation selection can be a part of a zoom selection. For example, a zoomed 3D display can rotate automatically (e.g., without additional user input) after a zoom selection is received. In various embodiments, a zoom rotation selection can comprise an interaction with a GUI (e.g., an interaction with GUI 343). For example, a user can tap or click an area on a 3D zoomed model to rotate the zoomed 3D display. As other examples, a user on a touch screen device can use a pinch, a reverse pinch, or a drag to rotate a zoomed 3D display. As further examples, a user using a mouse, trackball or joystick can actuate one or more inputs on the mouse, trackball, or joystick to rotate a zoomed 3D display (e.g., by performing movements that would click or move a cursor or by rolling a scroll wheel). As an additional example, a user can use a first interaction to select a zoom rotation point or to enter a zoom rotation mode on the GUI and then a second interaction initiate the zoom rotation (e.g., by clicking a point on a 3D display and then rolling a scroll wheel to rotate). In many embodiments, a GUI can comprise a zoom rotation bar or slider. In these embodiments, interacting with the zoom rotation bar or slider can cause a zoomed 3D display to rotate.

In many embodiments, method 400 can comprise an activity 409 of facilitating rotating a 3D display of an object in a zoomed 3D display. In some embodiments, activity 409 can be performed in response to one or more of activities 405-408. In these or other embodiments, radially captured image can be concatenated into a video and rotating a 3D display in a zoomed 3D display can comprise playing all or a portion of the video. In various embodiments, rotating a 3D display in a zoomed 3D display can comprise transitioning from a first image of an object to a second image of an object in a sequence. For example, when a 3D display is generated using radially captured images, rotating a 3D display in a zoomed 3D display can comprise transitioning from a radially captured image in a sequence to a subsequent (or previous) radially captured image in a sequence. In these or other embodiments, textures on a 3D model of an item can be transitioned from one image of an object to another image of the object when rotating a zoomed 3D display instead of changing an entire view in a 3D display. In various embodiments, a blended image can be displayed in activity 409. For example, when a user navigates to a zoomed position that does not align with one image captured in a 3D scanner, a blended image can be displayed. Using blended images in this fashion provides a number of advantages. This technique provides for generation of finer, smoother, and more detailed 3D displays. For example, texture continuity around concave surfaces (e.g., wheel wells) and knoblike shapes (e.g., car mirrors) can be increased, thereby providing for a more true to life representation of an object.

Figure 5:
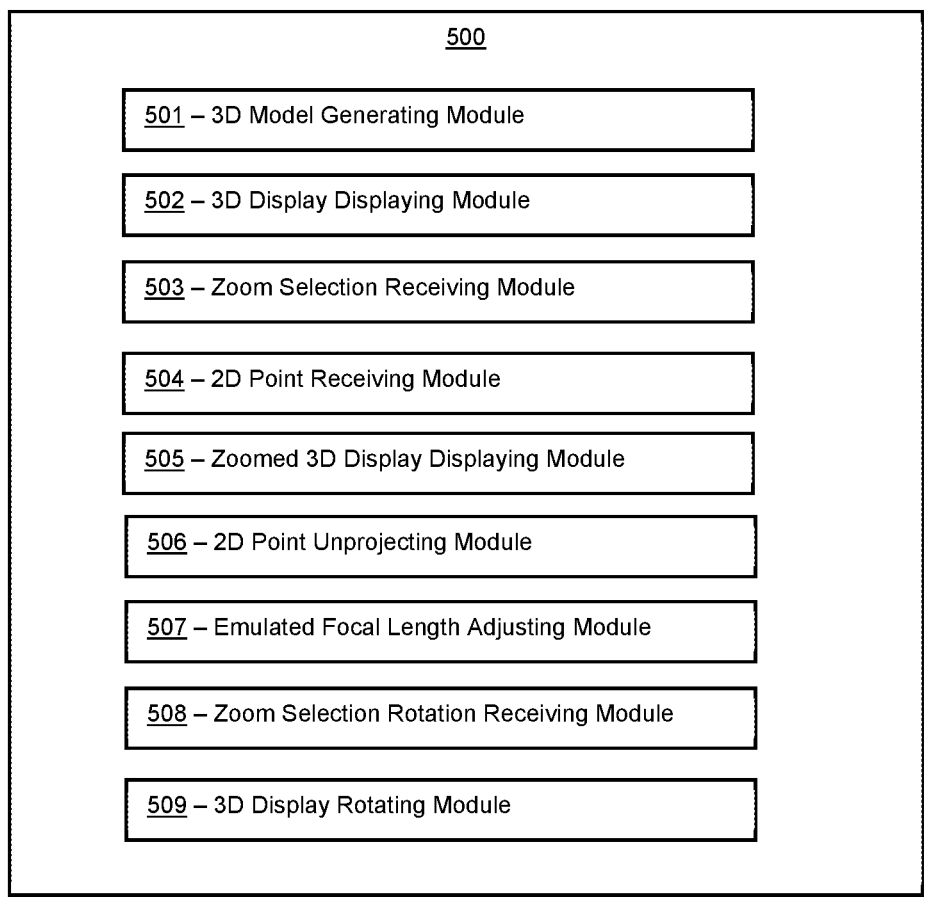
FIG. 5 illustrates a representative block diagram of a system, in accordance with various embodiments.

Turning ahead in the drawings, FIG. 5 illustrates a block diagram of a system 500 that can be employed for behavior based messaging. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500. In some embodiments, one or more portions of system 500 can be part of or in communication with image capture system 310, image rendering system 330, 3D display system 350, and/or user computer 360.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as 3D model generating module 501. In many embodiments, 3D model generating module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as 3D display displaying module 502. In many embodiments, 3D display displaying module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as zoom selection receiving module 503. In many embodiments, zoom selection receiving module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as 2D point receiving module 504. In many embodiments, 2D point receiving module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as zoomed 3D display displaying module 505. In many embodiments, zoomed 3D display displaying module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as 2D point unprojecting module 506. In many embodiments, 2D point unprojecting module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as emulated focal length adjusting module 507. In many embodiments, emulated focal length adjusting module 507 can store computing instructions configured to run on one or more processing modules and perform one or more acts of method 400 (FIG. 4) (e.g., activity 407 (FIG. 4)).

In many embodiments, system 500 can comprise non-transitory memory storage module 508. Memory storage module 508 can be referred to as zoom selection rotation receiving module 508. In many embodiments, zoom selection rotation receiving module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as 3D display rotating module 509. In many embodiments, 3D display rotating module 509 can store computing instructions configured to run on one or more processing modules and perform one or more acts of method 400 (FIG. 4) (e.g., activity 409 (FIG. 4)).

Although systems and methods for rotating an augmented reality display have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable storage devices storing computing instructions configured to run on the one or more processors and cause the one or more processors to perform:
receiving a zoom selection from an electronic device of a user;
in response to receiving the zoom selection, facilitating displaying a zoomed display of an item on the electronic device of the user;
receiving, from the electronic device of the user, a zoom rotation selection;
in response to receiving the zoom rotation selection, determining an axis of rotation using the zoom selection and the zoom rotation selection; and
facilitating rotating the item around the axis of rotation in the zoomed display on the electronic device of the user.

2. The system of claim 1, wherein the zoom selection comprises a first point on a first coordinate system or the zoom rotation selection comprises a second point on a second coordinate system.

3. The system of claim 2, wherein the first point comprises a first 2D point on the first coordinate system or the second point comprises a second 2D point of the second coordinate system.

4. The system of claim 1, wherein determining the axis of rotation comprises determining a 3D point for the axis of rotation to pass through.

5. The system of claim 1, wherein the zoomed display comprises a zoomed view of an imperfection on the item.

6. The system of claim 1, wherein the item comprises an automobile.

7. The system of claim 1, wherein the zoomed display comprises a synthetic background.

8. A method comprising:
receiving a zoom selection from an electronic device of a user;
in response to receiving the zoom selection, facilitating displaying a zoomed display of an item on the electronic device of the user;
receiving, from the electronic device of the user, a zoom rotation selection;
in response to receiving the zoom rotation selection, determining an axis of rotation using the zoom selection and the zoom rotation selection; and
facilitating rotating the item around the axis of rotation in the zoomed display on the electronic device of the user.

9. The method of claim 8, wherein the zoom selection comprises a first point on a first coordinate system or the zoom rotation selection comprises a second point on a second coordinate system.

10. The method of claim 9, wherein the first point comprises a first 2D point of the first coordinate system or the second point comprises a second 2D point of the second coordinate system.

11. The method of claim 8, wherein determining the axis of rotation comprises determining a 3D point for the axis of rotation to pass through.

12. The method of claim 8, wherein the zoomed display comprises a zoomed view of an imperfection on the item.

13. The method of claim 8, wherein the item comprises an automobile.

14. The method of claim 8, wherein the zoomed display comprises a synthetic background.

15. At least one article of manufacture including at least one non-transitory, tangible computer readable storage medium having instructions stored thereon that, in response to execution by at least one processor, cause the at least one processor to perform:
- receiving a zoom selection from an electronic device of a user;
- in response to receiving the zoom selection, facilitating displaying a zoomed display of an item on the electronic device of the user;
- receiving, from the electronic device of the user, a zoom rotation selection;
- in response to receiving the zoom rotation selection, determining an axis of rotation using the zoom selection and the zoom rotation selection; and
- facilitating rotating the item around the axis of rotation in the zoomed display on the electronic device of the user.

16. The at least one article of manufacture of claim 15, wherein the zoom selection comprises a first point on a first coordinate system or the zoom rotation selection comprises a second point on a second coordinate system.

17. The at least one article of manufacture of claim 16, wherein the first point comprises a first 2D point on the first coordinate system or the second point comprises a second 2D point of the second coordinate system.

18. The at least one article of manufacture of claim 15, wherein determining the axis of rotation comprises determining a 3D point for the axis of rotation to pass through.

19. The at least one article of manufacture of claim 15, wherein the zoomed display comprises a zoomed view of an imperfection on the item.

20. The at least one article of manufacture of claim 15, wherein the item comprises an automobile.

* * * * *